May 5, 1964 L. A. McNEELY 3,131,552
ABSORPTION REFRIGERATION SYSTEMS
Filed Jan. 6, 1961
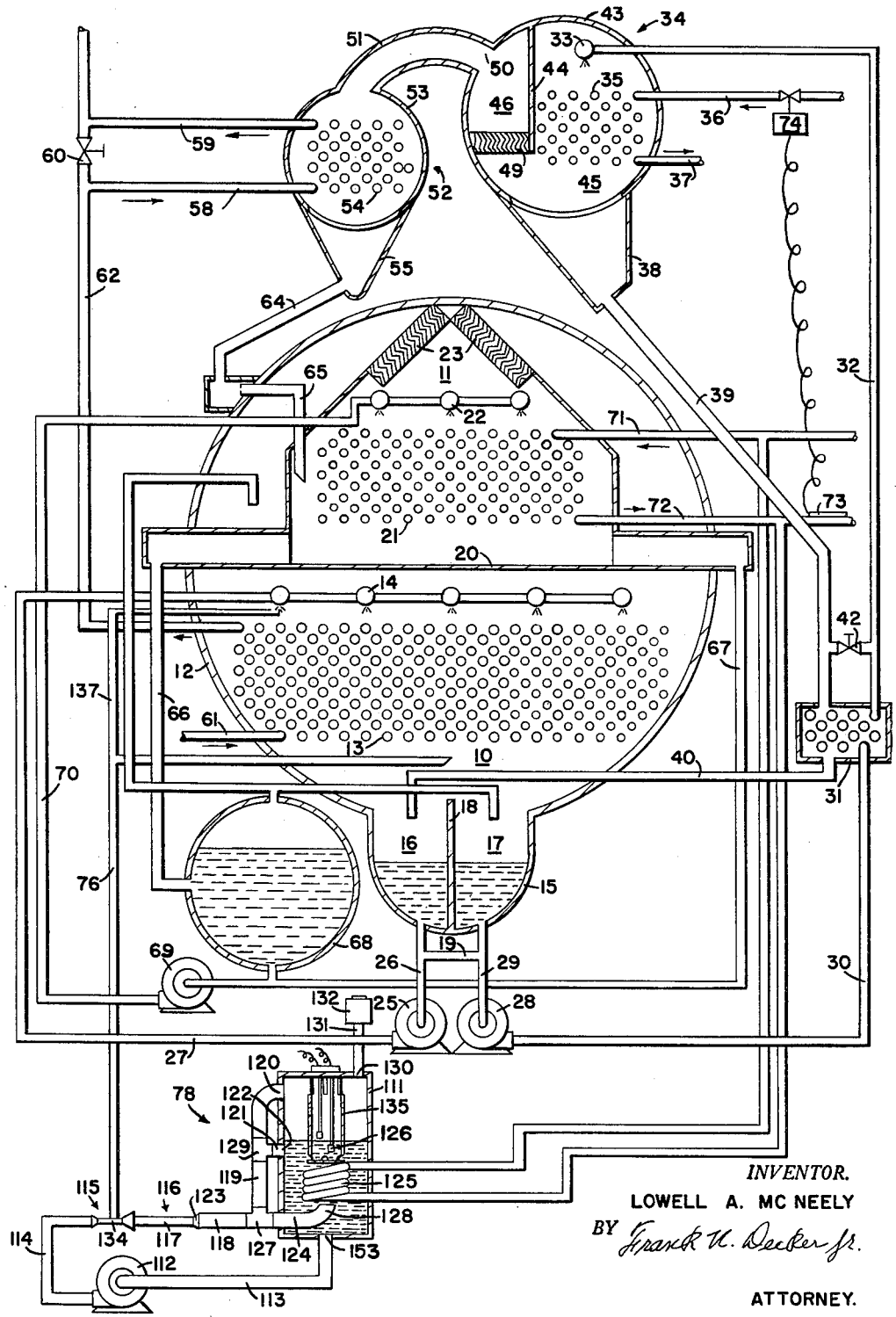
INVENTOR.
LOWELL A. MC NEELY
BY Frank N. Decker Jr.
ATTORNEY.

United States Patent Office 3,131,552
Patented May 5, 1964

3,131,552
ABSORPTION REFRIGERATION SYSTEMS
Lowell A. McNeely, Fayetteville, N.Y., assignor to Carrier Corporation, Syracuse, N.Y., a corporation of Delaware
Filed Jan. 6, 1961, Ser. No. 81,041
7 Claims. (Cl. 62—475)

This invention relates to purge arrangements and more particularly to a novel type of purge arrangement adapted for use in an absorption refrigeration system. Purges of the type herein described find particular application for use with absorption refrigeration machinery installed aboard submarines or other seagoing vessels wherein the refrigeration system may be required to operate in various angular positions due to pitching and rolling of the ship or due to trim or list thereof.

Absorption refrigeration systems are a preferred type of refrigeration aboard submarines and other seagoing vessels because of their characteristic of directly utilizing readily available steam as a power input without the necessity of converting the steam into rotational or other mechanical energy. In addition, absorption refrigeration machines may desirably utilize water as a refrigerant so that little danger to personnel results from a refrigerant leak such as might be occasioned by damage to the refrigeration machine.

A conventional absorption refrigeration machine comprises a generator to which the steam power input is passed, a condenser, an evaporator, and an absorber. The evaporator and absorber are in communication with each other generally by being placed in a single shell so that the absorber pressure and evaporator pressure are substantially the same. Such systems may desirably utilize water as the refrigerant and a solution of lithium bromide and water as an absorbent solution. The absorbent solution absorbs water vapor which evaporates in the evaporator and is diluted by the water vapor absorbed. The diluted or weak absorbent solution is then forwarded to the generator where the water vapor is boiled off of the weak solution and condensed in the condenser. The thereby concentrated or strong absorbent solution is returned to the absorber for reabsorption of more water vapor and the condensed water is forwarded back to the evaporator for re-evaporation. The evaporation of water vapor from the water in the evaporator causes the remaining water to be cooled and this cooled water is utilized either directly or indirectly to cool the desired areas of the ship or building in which the refrigeration system is installed.

It will be observed that an absorption refrigeration system obtains its cooling effect by the rapid evaporation of substantial quantities of water or other refrigerant in the evaporator due to a low pressure on the surface of the water. This low pressure is maintained by the continuous absorption of water vapor in the absorber. However, if air or other noncondensible gases are present in the absorber, the ability of the absorbent solution therein to absorb water vapor is greatly reduced. Air or noncondensible gases may be present in the system either because the system has not been completely evacuated of air, as when the machine is first started up, or due to air leakage into the system at the various pipe joints or due to the generation of noncondensible gases such as hydrogen in the system which may result from decomposition of water or be produced a byproduct of corrosion reactions occurring within the refrigeration system. Since the presence of even small amounts of air or noncondensible gases seriously reduces the capacity of the refrigeration system, it is important to continuously assure that such gases will be purged in order to maintain satisfactory performance from the system. Various methods and apparatus for achieving the desired result of purging noncondensible gases from an absorption refrigeration machine have been proposed.

Reference is made to Leonard Patent No. 2,940,273, granted June 14, 1960, as an example of a highly satisfactory type of purge arrangement. The Leonard patent referred to discloses a purge arrangement wherein a purge tank is provided with a quantity of absorbent solution similar to that in the absorber section of the refrigeration system. A purge pump pumps a quantity of absorbent solution from the purge tank through an ejector from which the absorbent solution is returned to the purge tank. A purge line communicates between the absorber section of the absorption refrigeration machine and a constricted portion, i.e., low pressure region, of the ejector. Noncondensible gases and water vapor are, therefore, drawn through the purge line to the ejector from which they flow into the purge tank. The bubbles of noncondensible gases rise to the surface of the tank and escape to the atmosphere. Periodically, the purging action is discontinued and some absorbent solution which has been diluted by water vapor is returned to the absorber.

However, purge arrangements of the type referred to above may not be altogether satisfactory for use aboard seagoing vessels such as submarines. For example, certain additives such as octyl alcohol (2 ethyl-n-hexanol) are frequently used in a refrigeration system to improve the performance of the absorber. In the confined areas of a submarine, it would be undesirable to allow octyl alcohol vapors to escape. Furthermore, the pitch and roll conditions encountered in a seagoing vessel require that the purge tank be substantially closed so that solution is not spilled from the tank.

In addition, in the system previously referred to, bubbles of noncondensible gases may be stirred up and remain entrained in the absorbent solution in the purge tank. While such an arrangement may be highly satisfactory for most uses, somewhat unusual conditions obtain in a refrigeration system adapted for use aboard seagoing vessels. Specifically, very severe stresses and strains may occasionally be imposed on the vacuum tight joints required in an absorption refrigeration machine installed aboard submarines due to mechanical shocks, the effect of which is intensified by the very great submergence pressures at some points of the refrigeration machine while other sections of the machine may operate at or below atmospheric pressures. Consequently, air or other gas leaks into the system may be more frequent with this type of equipment, requiring a greater amount of purging than conventional refrigeration systems. Since more bubbles of gas may have to be exhausted by the purge unit of a seagoing absorption refrigeration system, the problem of entrained gases in the solution in the purge unit becomes more severe.

Entrained gases in the solution are pumped by the purge pump through the jet ejector of the purge arrangement. Since the bubbles of entrained gas each contribute some pressure to the fluid flowing through the jector, they limit the maximum vacuum which can be pulled on the absorber by the purge ejector. If no entrained gases are present in the solution flowing through the ejector, the minimum pressure which can be pulled on the absorber through the purge line is equal to the vapor pressure of the absorbent solution at its temperature in the ejector. If bubbles of entrained gas are present in the solution flowing through the ejector, they raise the minimum pressure which can be pulled by the ejector on the absorber thereby decreasing the effectiveness of the purge arrangement.

It can be seen, therefore, that it would be desirable to provide a purge arrangement for an absorption refrigeration machine wherein the purge tank is substantially closed and wherein escape of noxious vapors may be prevented or controlled. It would also be desirable to recirculate absorbent solution through the ejector of the purge arrangement in a manner so that a minimum of entrained gases are present in the circulated solution even when substantial quantities of gases must be purged at infrequent intervals to maintain silence between purging intervals.

Accordingly, it is an object of this invention to provide an improved purge arrangement for an absorption refrigeration machine.

It is a further object of this invention to provide an an improved purge arrangement employing an ejector to induce noncondensible gases from the absorber of an absorption refrigeration machine wherein circulation of entrained gases through the ejector from the purge tank is reduced to a minimum.

It is a further object of this invention to provide an improved purge arrangement for an absorption refrigeration machine having means associated therewith to prevent or to control the discharge of noxious vapors from the purge unit.

It is a still further object of this invention to provide an improved absorption refrigeration system adapted for use aboard seagoing vessels.

These and other objects are achieved in the preferred embodiment of this invention, presently to be described, which comprises an absorption refrigeration machine having a generator, a condenser, an evaporator and an absorber in combination with a novel purge arrangement. The purge arrangement may comprise a generally closed purge tank having an outlet adjacent its upper portion for removal of noncondensible gases accumulated therein. A purge pump withdraws absorbent solution from the purge tank and passes it through an ejector from which it is returned to the purge tank. A purge line is connected between the absorber section and constricted region of the ejector whereby water vapor and other gases are induced into the purge tank by the passage of absorbent solution through the ejector.

A vertically extending line or passage is teed into an ejector discharge line connecting the ejector and the purge tank so that gases induced from the absorber pass upwardly through the vertically extending passage. The vertically extending passage may communicate with the upper portion of the purge tank so that these gases are accumulated at the top of the purge tank without having to pass upwardly through the absorbent solution in the tank. Consequently, the mixture of gas and absorbent solution in the purge tank is minimized. The ejector discharge line may be increased in diameter prior to the point of connection of the vertically extending passage so that the gases tend to rise to the top of the ejector discharge line and to reduce the velocity of the gases in the line thereby increasing their tendency to rise through the vertically extending passage.

A filter of activated charcoal or other absorbent medium may be placed in the gas outlet line from the purge tank to adsorb octyl alcohol vapors thereby substantially reducing the objectionable effects of directly discharging these vapors into the conditioned space when octyl alcohol is used as an additive in the absorption refrigeration system. In addition, a laterally extending line may teed into the vertically extending passage and communicate with the purge tank at a point intermediate its ends to cause circulation of solution and prevent accumulation of a layer of octyl alcohol at the top of the purge tank. This serves the dual purpose of reducing the amount of octyl alcohol loss due to vaporization of the alcohol at the top of the purge tank and also of mixing the octyl alcohol with the adsorbent solution in the tank so that when the contents of the purge tank are partially withdrawn back into the absorber, as previously described in connection with the Leonard patent, a proportional quantity of octyl alcohol is returned to the absorber rather than remaining in the purge tank. The latter feature substantially reduces the frequency with which octyl alcohol need be added to the system.

These and other objects of this invention will become more apparent by reference to the following detailed specification and attached drawing wherein:

The figure is a diagrammatic view of an absorption refrigeration machine embodying the novel purge arrangement of the instant invention.

Referring to the drawing, there is illustrated an absorption refrigeration system constructed in accordance with a preferred embodiment of this invention. The absorption refrigeration system comprises an absorber section 10 and an evaporator section 11 located within shell 12. A plurality of heat exchange tubes 13 adapted to pass cooling water are located within the absorber section. A spray system 14 comprising a plurality of headers and suitable spray nozzles is located above tubes 13 for the purpose of discharging a finely divided spray of absorbent solution thereover.

As used herein the term "strong solution" refers to a solution strong in absorbing power and the term "weak solution" refers to a solution weak in absorbing power. The term "intermediate concentration" is used to designate a solution having a concentration intermediate the concentrations of weak and strong solution.

A suitable refrigerant for a system of the type herein described comprises water and a suitable absorbent solution comprises a solution of lithium bromide and water. The concentration of lithium bromide leaving the generator may desirably be about 65%.

Adjacent to the lower portion of shell 12 and absorber section 10 is a sump 15 which is divided by vertically extending partition means 18 into an intermediate strength absorbent solution sump 16 and a weak absorbent solution sump 17. Both sumps collect absorbent solution sprayed over tubes 13 and sump 16 in addition receives strong solution from generator 34 which mixes therein to form absorbent solution of intermediate strength. A bypass line 19 may be provided to equalize fluid levels in the two sumps if desired. While for purposes of illustration, partition 18 has been shown as extending longitudinally of the machine, it will be appreciated that the illustration is schematic in nature and that partition 18 may extend transversely across sump 15 if desired.

Evaporator section 11, which is also located within shell 12, comprises a pan or vessel 20 within which are disposed a plurality of heat exchange tubes 21 which are adapted to carry a chilled fluid such as water to suitable heat exchangers located remotely from the refrigeration machine to provide cooling or dehumidification in the desired areas. Disposed above tubes 21 in the evaporator section is a suitable refrigerant distributor 22 which may include a plurality of headers each having a number of sprays in communication therewith to evenly distribute refrigerant over heat exchange tubes 21.

Pan 20, as illustrated in the drawing, has relatively high vertically extending walls to prevent transfer of refrigerant in the liquid state directly to the absorber section even when disposed at substantial angles to their normal position. The vertically extending walls of pan 20 terminate in eliminators 23 which provide a tortuous path for the passage of refrigerant vapor on its way to the absorber and thereby remove droplets of liquid refrigerant from spray system 22 which may have become entrained in the refrigerant vapor. Pump 25 passes accumulated absorbent solution of intermediate concentration from sump 16 through lines 26 and 27 to spray system 14 to maintain a continuous spray of absorbent solution over tubes 13.

Pump 28 passes absorbent solution relatively weak in absorptive capability through lines 29 and 30 to solution heat exchanger 31. Line 32 passes the weak solution from solution heat exchanger 31 to refrigerant distribution means 33 of generator 34. Distribution means 33 may suitably comprise a header having a plurality of spray nozzles in communication therewith disposed above tube bundle 35.

Generator 34 comprises a shell 43 having vertically extending partition means 44. Partition 44 may be secured to the upper portion of shell 43 and divides the generator into a first compartment 45 and a second compartment 46. Heat exchange tube bundle 35 is disposed within first compartment 45. Steam inlet 36 and a steam and condensate outlet 37 is provided to pass steam through the heat exchange tubes within tube bundle 35. A sump 38 having angular side walls is disposed adjacent the lower portion of shell 43 adjacent at least one end thereof and serves to receive strong solution concentrated by the generator and pass it through line 39 to heat exchanger 31. Preferably, sump 38 comprises a pair of sumps at each end of shell 43 each connecting with line 39 and extending below the bottom of shell 43 as shown in the drawing.

Warm strong solution is passed from generator 34 through line 39 to solution heat exchanger 31 and is cooled by heat exchange with cold weak solution passing through the heat exchanger from line 30 to line 32 on its way to the generator. The cooled strong solution is then passed from heat exchanger 31 through line 40 into intermediate absorbent concentration solution sump 16 of absorber 10. Upon being discharged into sump 16 the strong solution is further cooled by flashing due to the lower pressure in absorber 10 than exists in generator 34. Sump 38 and line 39 and 40 are sized so as to substantially prevent accumulation of solution in generator 34 while permitting gravity return of the strong solution into sump 16.

First compartment 45 and second compartment 46 of generator 34 are in communication with each other adjacent their respective lower portions because partition means 44 extends only part way down from the top of shell 43.

If desired, an eliminator 49 may be disposed in second compartment 46 to further assure complete elimination of any remaining solution. An outlet 50 and a refrigerant vapor line 51 is located above eliminator 49 and leads from second compartment 46 to a condenser 52.

Condenser 52 comprises shell 53 and a sump 55 to collect condensed refrigerant vapor. A plurality of heat exchange tubes 54 are disposed within shell 53 and inlet line 58 and outlet line 59 are provided for cooling water which in the case of a seagoing vessel may comprise sea water into tubes 54 to extract heat from the vaporized refrigerant and to condense it. Bypass valve 60 may be provided to bypass cooling fluid around tubes 54, if desired.

From sump 55 condensed refrigerant flows through line 64 and line 65 and is discharged into evaporator pan 20. Lines 66 and 67 connect to evaporator pan 20 adjacent the bottom thereof for the purpose of assuring a drainage of the pan irrespective of the angular position of the absorption machine. It will be observed that a pair of each of lines 66 and 67 should be provided at both ends of pan 20 in order to take care of both pitch and roll conditions of the vessel. Lines 66 and 67 drain substantially all of the refrigerant from pan 20 preventing refrigerant accumulation therein. Lines 66 and 67 discharge into refrigerant storage tank 68 thereby assuring that refrigerant will not be emptied from pan 20 into absorber 10 under severe conditions of pitch and roll.

Pump 69 forwards refrigerant from storage tank 68 back through line 70 to refrigerant distributor 22 for respraying over heat exchange tubes 21 resulting in vaporization and cooling of the liquid refrigerant in the evaporator due to the low pressure in the absorber. It will be understood that absorber 10 is in open communication with evaporator 11 through eliminators 23.

Vaporization or evaporation of refrigerant in evaporator 11 results in cooling of the refrigerant due to the heat which is removed to convert the refrigerant from a liquid state to a vapor state. Consequently, the fluid in heat exchange tubes 21 is continuously cooled by heat exchange with refrigerant in the evaporator. This cooled fluid is then transmitted to suitable remotely located heat exchangers through line 72 for cooling or dehumidification of the desired areas. The warmed fluid which has removed heat from the desired areas is then returned through line 71 to heat exchange tubes 21 for recooling.

The heat of dilution and condensation of the absorbent solution is removed from the absorber by passing sea water or other cooling fluid through inlet 61 to tubes 13 and through outlet 62 where the cooling fluid is passed to heat exchange tubes 54 of the condenser.

Capacity control of the absorption refrigeration machine described may be obtained through control of the concentration of strong solution returned from generator 34 to absorber 10. The concentration of the absorbent solution in turn is controlled by the steam input through line 36 by regulation of steam control valve 74. Bulb 73 or other suitable temperature sensing means is secured to outlet line 72 of evaporator 11 and senses the leaving water temperature from the evaporator. When the heat load to be rejected increases, the leaving water temperature tends to rise. This rise is sensed by bulb 73 which opens steam valve 74 to a position such that it passes more steam to the generator. The additional steam supplied to the generator concentrates the absorbent to a higher degree which in turn increases the capacity of the refrigeration system by increasing the quantity of refrigerant absorbed by the more concentrated solution in the absorber.

To prevent solidification and consequent blocking of heat exchanger 31 by over-concentrated absorbent being cooled therein below the temperature at which it solidifies, a suitable bypass valve 42 may be provided as described in Leonard application Serial No. 2203, filed January 13, 1960, now Patent No. 3,054,272. A purge line 76 and suitable purge 78 are provided adjacent the lower portion of absorber 10 to remove noncondensibles from the refrigeration system.

In operation the present invention provides an absorption refrigeration machine and system which is capable of operating in a plurality of angular positions such as may be encountered due to pitching and rolling of a seagoing vessel. Such a system is particularly advantageous for air conditioning of a submarine where in addition to the usual pitch and roll conditions substantial listing or trim conditions may be experienced. Further advantages of the refrigeration system described reside in its relatively noiseless operation and its rapid recovery rate in the event of extremely severe rolls. An additional important advantage of a refrigeration machine of the type described lies in the fact that neither the refrigerant nor the absorbent are noxious, toxic or otherwise dangerous to personnel so that leakage which might result from damage to the machine does not present a serious personnel hazard.

Purge 78 comprises a purge tank 111, a purge pump 112, and an ejector 115. Purge pump 112 is connected to purge tank 111 by a solution outlet line 113 and the purge pump is connected to ejector 115 by an ejector inlet line 114. Fluid is returned from ejector 115 to purge tank 111 through ejector discharge line 116. Ejector 115 has a reduced diameter portion or high fluid velocity region 134 at which purge line 76 is connected.

Ejector discharge line 116 comprises a relatively narrow diameter portion 117 and an enlarged diameter portion 118 which may be connected by a suitable reduction coupling 123. Enlarged diameter portion 118 passes into purge tank 111 through solution inlet port 124 and terminates in an upwardly directed nozzle 128.

A vertically extending line or passage 119 is teed into ejector discharge line 116 and communicates with purge tank 111 through upper port 120 which is located adjacent the upper portion of the purge tank. A lateral line 121 may be connected to upwardly extending passage 119 by means of a suitable joint 129. Laterally extending line 121 communicates with purge tank 111 through port 122 intermediate to the ends of purge tank 111 and which is located between upper portion 120 and solution inlet port 124.

A cooling coil 125 through which cooling fluid is passed removes heat added to absorbent solution in purge tank 111 and also reduces the temperature of the adsorbent solution so that a suitably low vapor pressure is maintained for effective operation of ejector 115.

A suitable liquid level control comprising probes 126 which may comprise a plurality of copper probes serves to sense the level of absorbent solution in purge tank 111. When the level of solution in the purge tank reaches an upper probe, purge pump 112 may be stopped allowing solution to be withdrawn from the purge tank into the absorber by the relatively low pressure in the absorber section. When the level of solution in the purge tank drops below a lower probe 126, purge pump 112 may again be actuated to continue purging. This operation serves to return absorbent solution in tank 111 which has been diluted by absorbent added to the purge tank through line 137 and water vapor pulled from the absorber through purge line 76. Reference is made to Leonard Patent 2,959,935, granted November 15, 1960, for a more complete description of a suitable type of probe.

A shroud 135 may desirably be placed around probes 126 to prevent false level sensing by the probes due to angular trim or list of the ship or splashing of solution in purge tank 111 due to pitch or roll. Shroud 135 is desirably open at its lower portion to admit solution and vented at its upper portion to the interior of the purge tank so that probes 126 accurately sense the level of solution. Additional adsorbent solution is forwarded to purge tank 111 through line 137 and purge line 76 to maintain a desired concentration in the purge tank.

In operation, pump 112 withdraws adsorbent solution through solution outlet port 153 and forwards it through lines 113 and 114 to ejector 115. Since the velocity of solution pumped through restricted portion 134 of ejector 115 is relatively high, it will be appreciated that a low pressure approaching the vapor pressure of the absorbent solution at its temperature in tank 111 will be manifested in purge line 76. Consequently, air, hydrogen or other noncondensible gases together with water vapor will be withdrawn from absorber section 10 and forwarded through ejector discharge line 116 toward purge tank 111.

As the mixture of gas and absorbent solution passes reduction coupling 123 and enters enlarged diameter portion 118 of ejector discharge line 116, the velocity of the mixture substantially decreases. The bubbles of gas therefore, rise toward the top of the ejector discharge line and upon reaching T joint 127 tend to pass upwardly through vertically extending passage 119 where they are free to enter purge tank 111 through upper portion 120. The absorbent solution and some remaining bubbles of entrained gas are forwarded through solution inlet port 124 and are directed upwardly toward the surface of purge tank 111 by nozzel 128. Consequently, the entrained bubbles of gas are forcibly ejected toward the surface of the purge tank where they may escape through gas outlet port 130.

It will be noted that solution outlet port 153 is located adjacent the lower portion of purge tank 111 so that the absorbent solution withdrawn through the outlet port by pump 112 will contain a minimum of entrained gas thereby improving the effectiveness of ejector 115. It will also be observed that absorbent solution withdrawn through solution outlet port 153 must first pass upwardly through the inner portion of helical cooling coil 125 and thence downwardly around the outside of the cooling coil so that the absorbent solution is adequately cooled and consequently, its vapor pressure reduced for effective operation of ejector 115.

Lateral line 121 is preferably connected to purge tank 111 at or slightly below the average level of absorbent solution in the tank. Consequently, some absorbent solution from ejector 115 rises upwardly through vertical passage 119 and is passed to purge tank 111 through lateral line 121. This maintains continuous circulation of liquid in purge tank 111 so that octyl alcohol, which has a tendency to float on the top of a lithium bromide and water solution, is continuously mixed with the absorbent. Therefore, when the purging cycle is stopped by discontinuance of pump 112 due to dilution of the solution in tank 111 such that upper probe 126 senses a high level of liquid in the purge tank, a proportional quantity of octyl alcohol and absorbent solution is returned to absorber section 10 of the refrigeration machine. If circulation of solution in tank 111 were not maintained, the octyl alcohol would have a tendency to float near the upper portion of the tank and only absorbent solution would be returned to the absorber section of the machine. This would eventually result in a high concentration of octyl alcohol in tank 111 and a consequent reduction of the amount of octyl alcohol in the absorber where it is required. In addition, octyl alcohol floating on the surface of purge tank 111 would tend to vaporize and pass through gas outlet 130 where it would be discharged from the system. This is undesirable not only because of the loss of octyl alcohol from the system, which would require more frequent replenishment, but also because in a confined space such as in a submarine, the discharge of octyl alcohol in the atmosphere would be objectionable. Lateral line 121 also tends to skim octyl alcohol from the surface of the purge tank and return it to the absorber along with the solution returned to the absorber at the end of the purge cycle.

Some octyl alcohol will vaporize in purge tank 111 and pass upwardly through gas outlet 130 and through gas outlet line 131. In order to prevent discharge of this octyl alcohol vapor into the inhabited quarters of the submarine or other undesired location a suitable filter 132 is placed in gas outlet line 131. Filter 132 may desirably comprise a quantity of activated charcoal disposed in a manner to contact vapors discharged from purge tank 111. Since activated charcoal has an affinity for octyl alcohol, the octyl alcohol will be trapped in the filter by adsorption onto the surface of the charcoal. Other noncondensible gases for which the charcoal has little or no affinity may be passed through the filter and discharged directly to the atmosphere or other desired location.

The improved purge unit described is characterized by its ability to function effectively in a plurality of angular positions without either ceasing operation or spilling solution from the purge tank. Also, a purge arrangement in accordance with the instant invention is adapted to effectively purge relatively large quantities of noncondensible gases from an absorption refrigeration system without impairment of the operation of the ejector unit by the mixture of gas with solution passed through the ejector. Consequently, both the pull down and steady state operating characteristics of this invention make it a particularly suitable purge for use in applications for substantial quantities of gas may be required to be purged such as in a seagoing vessel where severe stresses and strains or damage may occasion leaks in a refrigeration system.

While a preferred embodiment of this invention has been illustrated and described, it will be appreciated that other modifications and embodiments will become apparent to those skilled in the art within the scope of the following claims.

I claim:

1. In a purge arrangement for an absorption refrigeration machine comprising an absorber section, an evaporator section, a generator section and a condenser section, the combination of a purge tank, gas outlet means to discharge noncondensible gases from said purge tank, an ejector, a purge pump, means to pass solution from said purge tank to said purge pump and through said ejector, means to return solution from said ejector to said purge tank, means connecting said absorber to a low pressure region of said ejector for removing a mixture of noncondensible gases from said refrigeration machine and discharging said mixture toward said purge tank together with the solution passing through said ejector, and a vertically extending passage connected between the outlet of said ejector and an upper region of said purge tank for passing directly noncondensible gases separately from solution returned from the ejector to said upper region of the purge tank so as to minimize the quantity of noncondensible gases in solution passed through said ejector from said purge pump, thereby improving the effectiveness of the purge arrangement.

2. In a purge arrangement for an absorption refrigeration machine comprising an absorber section, an evaporator section, a generator section and a condenser section, the combination of a purge tank, gas outlet means to discharge noncondensible gases from said purge tank, an ejector, a purge pump, a purge line connecting the absorber section of said refrigeration machine to said ejector for removing a mixture of noncondensible gases and absorbent solution from said refrigeration machine, a solution outlet line connecting said purge tank with said purge pump, an ejector inlet line connecting said purge pump with an inlet of said ejector, an ejector discharge line connecting the outlet of said ejector to said purge tank so that absorbent solution may be withdrawn from said purge tank, pumped through said ejector and returned to said tank to simultaneously withdraw noncondensible gases from said absorber section through said purge line due to a relatively low pressure in said purge line created by said ejector, and a vertically extending passage connecting the outlet line of said ejector with the upper portion of said purge tank for passing noncondensible gases withdrawn from said absorber to the upper portion of said tank separately from the solution returned to said tank from said ejector.

3. A purge arrangement for an absorption refrigeration machine as defined in claim 2 wherein said line connecting the outlet of said ejector with said purge tank is increased in diameter adjacent the connection therewith of said vertically extending line to reduce the velocity of the noncondensible gases in said ejector discharge line thereby tending to cause said noncondensible gases to rise upwardly through said vertically extending passage.

4. A purge arrangement for an absorption refrigeration machine as defined in claim 2 wherein said ejector discharge line enters said purge unit and terminates therein in an upwardly directed nozzle, and said solution outlet line is connected to said purge tank adjacent a lower portion thereof so that bubbles of gases entering said purge unit are directed toward the upper portion of said purge tank and the absorbent solution withdrawn from said purge tank is relatively free of entrained gases.

5. A purge arrangement for an absorption refrigeration machine as defined in claim 2 including a lateral line communicating said vertically extending passage and said purge tank at a point intermediate the ends of each to reduce the accumulation of additives in the upper portion of said tank.

6. A purge arrangement for an absorption refrigeration machine as defined in claim 2 including an outlet for noncondensible gases adjacent the upper portion of said purge tank for discharging gases removed by said purge unit from said absorption refrigeration machine and expelling them from the system, an adsorbent medium located in the path of said gases for contact therewith to retain a predetermined gas by adsorption thereof.

7. A purge arrangement as defined in claim 6 for an absorption refrigeration machine of the type containing octyl alcohol as an additive and wherein said adsorbent medium comprises an activated charcoal filter so that contamination of the gases exhausted from said system with octyl alcohol is inhibited by adsorption of the octyl alcohol in the activated charcoal.

References Cited in the file of this patent
UNITED STATES PATENTS

| | | |
|---|---|---|
| 2,202,010 | Kondolf | May 28, 1940 |
| 2,765,634 | Whitlow | Oct. 9, 1956 |
| 2,940,273 | Leonard | June 14, 1960 |
| 2,959,935 | Leonard | Nov. 15, 1960 |
| 3,014,349 | Leonard | Dec. 26, 1961 |